US012577937B2

(12) United States Patent
Hawkins et al.

(10) Patent No.: US 12,577,937 B2
(45) Date of Patent: Mar. 17, 2026

(54) METHOD OF RESTARTING A WIND TURBINE

(71) Applicant: Siemens Gamesa Renewable Energy A/S, Brande (DK)

(72) Inventors: Samuel Hawkins, Vejle (DK); Christian Joachim Krogh, Aarhus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/695,956

(22) PCT Filed: Sep. 21, 2022

(86) PCT No.: PCT/EP2022/076162
§ 371 (c)(1),
(2) Date: Mar. 27, 2024

(87) PCT Pub. No.: WO2023/052210
PCT Pub. Date: Apr. 6, 2023

(65) Prior Publication Data
US 2025/0003383 A1 Jan. 2, 2025

(30) Foreign Application Priority Data
Oct. 1, 2021 (EP) .................................... 21200567

(51) Int. Cl.
*F03D 7/02* (2006.01)
(52) U.S. Cl.
CPC .......... *F03D 7/026* (2013.01); *F05B 2260/64* (2013.01); *F05B 2260/85* (2013.01)

(58) Field of Classification Search
None
See application file for complete search history.

(56) References Cited

U.S. PATENT DOCUMENTS

| | | | |
|---|---|---|---|
| 7,098,550 B2 * | 8/2006 | Wobben | H02J 3/381 290/55 |
| 10,063,093 B2 * | 8/2018 | Beekmann | F03D 7/026 |

(Continued)

FOREIGN PATENT DOCUMENTS

| | | |
|---|---|---|
| EP | 3236064 B1 | 8/2018 |
| JP | 6166288 B2 | 7/2017 |

(Continued)

OTHER PUBLICATIONS

PCT International Search Report and Written Opinion for PCT/EP2022/076162, mailed on Jan. 11, 2023.

*Primary Examiner* — Tulsidas C Patel
*Assistant Examiner* — S. Mikailoff
(74) *Attorney, Agent, or Firm* — Schmeiser, Olsen & Watts LLP

(57) ABSTRACT

A method of controlling a wind turbine is provided, including the steps of detecting a power-on time ($T_{AP\_on}$) at which auxiliary power becomes available after an absence of auxiliary power; determining, at power-on time ($T_{AP\_on}$), the elapsed time ($T_{elapsed}$) since a dryness requirement of the wind turbine was satisfied; and subsequently initiating a wind turbine start-up procedure if the elapsed time ($T_{elapsed}$) does not exceed a predetermined duration ($T_{safe}$) or inhibiting a wind turbine start-up procedure if the elapsed time ($T_{elapsed}$) exceeds the predetermined duration ($T_{safe}$).

10 Claims, 7 Drawing Sheets

(56)  References Cited

U.S. PATENT DOCUMENTS

2014/0346781  A1     11/2014   Airoldi et al.
2015/0042094  A1      2/2015   Beekmann
2025/0003383  A1*     1/2025   Hawkins ............... F03D 7/0284

FOREIGN PATENT DOCUMENTS

KR       2014 0138062  A     12/2014
WO         2007/051464  A1     5/2007
WO         2008/092449  A2     8/2008
WO         2021/180525  A1     9/2021
WO      WO-2023160914  A1 *   8/2023   ............. F03D 80/60

* cited by examiner

PRIOR ART

METHOD OF RESTARTING A WIND TURBINE

CROSS-REFERENCE TO RELATED APPLICATIONS

This application claims priority to PCT Application No. PCT/EP2022076162, having a filing date of Sep. 21, 2022, which claims priority to European Application No. 21200567.2, having a filing date of Oct. 1, 2021, the entire contents all of which are hereby incorporated by reference.

FIELD OF TECHNOLOGY

The following relates to a method of controlling a wind turbine.

BACKGROUND

The electrical systems of a wind turbine must be protected from exposure to moisture and condensation in order to minimize the risk of short circuits, and to avoid damage from corrosion.

However, an insulation system between electrical conductors of differing potentials can comprise materials that become hygroscopic at high relative humidity levels. The moisture absorbed into such materials lowers the electrical resistance of the material, and a short circuit may result.

Short circuits may also arise from standing water in the form of water droplets on printed circuit boards. Water droplets may also allow current to flow between conductors that are normally separated by air. In addition to increasing the risk of short circuit, standing water can damage components by accelerating oxidation.

Therefore, a wind turbine is generally equipped with a climate control arrangement comprising various auxiliary devices such as dehumidifiers, heaters, thermostats, ventilators etc. Collectively, the devices of a climate control arrangement can be operated to maintain a low relative humidity inside the nacelle or canopy, and to maintain the surface temperatures of components above the dew point. In this way, the presence of moisture within insulation systems can be kept to a favorable minimum, and standing water can be effectively eliminated.

To provide power to such auxiliary devices, a wind turbine may receive auxiliary power from the grid. Therefore, auxiliary power is absent from the onset of an off-grid event. While a wind turbine may also be equipped with a local power source such as a battery system, such a battery system is usually small and is only able to supply "small" power consumers (e.g., devices that draw low levels of current) but not the entire auxiliary system comprising "large" consumers such as ventilator fans, heaters, pumps and motors etc., of a climate control arrangement. During pre-installation, storage or transport stages, auxiliary power may be supplied by a temporary diesel generator or similar, and in this case the auxiliary power may become absent if the generator fails or when the generator fuel is depleted.

When auxiliary power supply is unavailable for a prolonged length of time, temperature and relative humidity levels in the wind turbine interior will become similar to temperature and relative humidity levels in the outside environment. By the time the auxiliary power supply is once again available, the level of moisture absorbed by hygroscopic insulation materials may have reached a critical level, and/or water droplets may have condensed onto electrical components such as circuit boards, exposed conductors, etc.

A re-start of the wind turbine under these conditions would be hazardous for the reasons given above.

Therefore, it is necessary to postpone start-up until conditions in the wind turbine interior are acceptable. After a long absence of auxiliary power (e.g., more than 72 hours), an extended dry-out time (e.g., 24 hours) during which the climate control arrangement is operated at full capacity may be considered necessary to sufficiently remove the risk of electrical system damage. The long dry-out time can present a significant cost factor, for example during installation, when it is desired to start-up and test a new wind turbine. In the case of an already operational wind turbine, the long dry-out time means an equally long time during which revenue cannot be generated.

Generally, the need to perform dry-out of the wind turbine interior is evaluated by an operator of the wind turbine, who then manually activates the environmental control systems. A problem with this approach is that the recent environmental history of the wind turbine interior is not always known to the operator. As a result, the dry-out initiated by the operator may be unnecessarily long (resulting in delay-related costs and/or loss of revenue) or insufficiently long (increasing the risk of short-circuit damage).

SUMMARY

An aspect relates to a more reliable approach to re-starting a wind turbine.

In the following, a wind turbine may be assumed to comprise several electrical systems arranged in the wind turbine interior and exposed to air. The "interior" can be inside the nacelle, inside the tower, inside the generator, etc. Any electrical system that is not hermetically sealed may be assumed to be "exposed to the air".

According to embodiments of the invention, the method of controlling such a wind turbine comprises the steps of detecting the availability of auxiliary power after an absence of auxiliary power, and then determining the elapsed time since a dryness requirement of the wind turbine was last satisfied. The inventive method comprises a subsequent step of initiating a wind turbine start-up procedure essentially immediately upon restoration of auxiliary power if the elapsed time does not exceed a predetermined duration, or inhibiting a wind turbine start-up procedure if the elapsed time exceeds the predetermined duration.

The "dryness requirement" of an electrical system can be understood as a combination of parameters relating for example to temperature and moisture that must be fulfilled in order for that system to safely operate. The dryness requirement of an electrical system can itself be a variable and can fluctuate according to fluctuations in temperature and/or humidity, for example.

An advantage of the inventive method is that it provides a more considered way of resuming operation once auxiliary power is restored. Instead of simply waiting for a set dry-out time—for example 24 hours—to elapse after power restoration, the actual state of dryness of the electrical systems is established or estimated. Therefore, when auxiliary power becomes available, the wind turbine controller knows whether or not a "dry" state is fulfilled.

In this way, the inventive method allows the wind turbine to resume operation within a favorably short time after restoration of auxiliary power, thereby reducing the cost of wind turbine installation, and—later on—reducing loss of revenue after a shutdown.

As indicated above, a wind turbine can comprise any number of electrical systems arranged in its interior, as well as auxiliary devices that must be provided with auxiliary power. According to embodiments of the invention, the control arrangement of such a wind turbine comprises a means for detecting the availability of auxiliary power after an absence of auxiliary power. The control arrangement of the inventive wind turbine also comprises determining the elapsed time since a dryness requirement of the wind turbine was satisfied; and subsequently initiating a wind turbine start-up procedure if the elapsed time does not exceed a predetermined duration or "safe" time, or inhibiting a wind turbine start-up procedure if the elapsed time exceeds the predetermined duration.

The initiating or inhibiting a wind turbine start-up procedure can be a logic module that evaluates the relevant information, and which accordingly activates a startup inhibit signal (this prevents a startup procedure from commencing) or clears the startup inhibit signal (a startup procedure may commence).

The predetermined duration can be in the order of 72 hours, for example. The predetermined duration can be specific to a wind turbine type, and can take into consideration the air-tightness of structural elements such as the nacelle, a canopy, housings, etc. The predetermined duration can also be determined on the basis of empirical data observed for a wind turbine type.

Embodiments of the invention take a more considered approach to identifying a safe time to restart the wind turbine, by establishing whether it is even necessary to perform a dry-out procedure, and—if such a procedure is necessary—computing the actual length of time required to achieve a dry state.

In an embodiment of the invention, the time at which a dryness requirement is satisfied is recorded as a "system dry" timestamp. In various embodiments of the invention, a dryness timestamp can apply to an electrical system, to one or more electrical systems, to the wind turbine as a whole, etc. In the following, the terms "system dry timestamp" and "dryness timestamp" are regarded as synonyms and may be used interchangeably. The dryness timestamp may be a set of parameters such as the time of logging or updating the timestamp, and a flag such as a logic level (e.g., "1" for dry, "0" for not dry).

Auxiliary power may become absent for a number of reasons as explained above. Most often, an absence of auxiliary power is concurrent with an off-grid state of an already operational wind turbine. However, auxiliary power can also be absent in the initial stages of a wind turbine, i.e., in the stage immediately prior to commissioning. The controller of a newly installed prior art wind turbine may be configured to inhibit or block startup for a predetermined duration, regardless of the dryness of the electrical systems. Startup of the wind turbine is prevented as long as the "inhibit startup" signal is active.

Embodiments of the invention are based on the insight that an electrical system may be assumed to be dry if it has not been exposed to moisture and cold temperatures between the time of manufacture and the time of installation in the wind turbine. Therefore, in an embodiment of the inventive method, the dryness timestamp is initialized (set to "dry") at the time of assembly of the wind turbine. In this way, as soon as wind turbine installation is complete, the wind turbine can start to export output power and to generate revenue.

The length of the predetermined duration can depend on various factors such as the wind turbine type, its geographical location, etc. An exemplary value can be in the order of 72 hours, and this "safe limit" can be stored as a pre-set value in a memory of the wind turbine controller, for example. Embodiments of the invention are based on the insight that it can safely be assumed that the level of dryness of an electrical system will remain acceptable within that "safe limit" after loss of auxiliary power. It follows that if auxiliary power becomes available within that "safe limit" following a loss of auxiliary power, the wind turbine can be re-started without any need for a dry-out procedure.

Equally, if auxiliary power was absent for longer than this "safe limit", it cannot be assumed that an electrical system is dry. Therefore, in an embodiment of the invention, if the wind turbine is deemed not to be "dry", the method comprises a step of computing a dry-out time. The dry-out time can be established in a number of ways.

In one exemplary approach, the dry-out time can be computed on the basis of the time elapsed since the dryness timestamp was last updated. The length of the dry-out time may be directly proportional to the elapsed time, for example. This approach can also take into consideration the current climate conditions in the interior, and the efficacy of the climate control arrangement.

Parameters such as temperature, humidity, resistivity etc. can be measured by suitable sensors, for example a surface temperature sensor, an air temperature sensor, a humidity sensor, etc. In an embodiment of the invention, the electrical systems of the wind turbine are equipped with a suitable arrangement of such sensors, so that the individual environment within each such electrical system can be monitored. A sensor can essentially continuously measure and generate an output signal, for example a temperature sensor can deliver an updated temperature reading every few seconds. Each electrical system can be equipped with several such sensors arranged to measure the quantities of interest. For example, a frequency converter might be equipped with an air temperature sensor, a surface temperature sensor, a sensor that measures relative humidity of the air, etc. The arrangement of sensors arranged in the electrical systems of the wind turbine can be configured in any suitable way so that the wind turbine controller can be supplied with the measurements.

In an embodiment of the invention, the sensors of an electrical system are connected to a datalogger, and the datalogger is configured to provide the wind turbine controller with its record of measurements. Several such dataloggers can be deployed to collect and record sensor data from the plurality of electrical systems in the wind turbine. Each datalogger is allocated to an electrical system and configured to receive sensor data from one or more sensors arranged in close proximity to that electrical system. A datalogger can be configured to receive sensor data from more than one electrical system.

In an embodiment of the invention, a datalogger is activated at the time of assembly of the electrical system. In other words, when manufacture of the electrical system is complete along with the desired arrangement of sensors, the sensors are connected to a battery-operated datalogger and the datalogger commences recording sensor data. In this way, a record of the environment history is collected for an electrical system, starting from the time of its manufacture. A datalogger can have a memory configured to record input of the last five days, the last ten days, etc., or may have an essentially unlimited capacity to store sensor data. The datalogger of an electrical system shall be assumed to remain active during the lifetime of the electrical system. Generally, a battery-operated datalogger consumes only a very small current, so that the battery can last for several years. By timely replacement of the datalogger batteries, for example in the course of an annual inspection, an uninterrupted record of the environment history of the electrical systems can be assured.

In an embodiment of the invention, the wind turbine controller retrieves the data stored in each datalogger and determines the dry-out time from analysis of the retrieved data. Analysis of a datalogger's record for the time without auxiliary power may reveal that the temperature and humidity in that electrical system remained at acceptable levels. The associated electrical system would therefore not require any drying out. The analysis of all dataloggers might reveal that none of the electrical system requires dry-out. In that case, the wind turbine can be restarted immediately.

However, if the analysis of any one datalogger's record (for the time without auxiliary power) reveals that the temperature and humidity of an associated electrical system departed from the acceptable levels, a dry-out procedure is initiated for that electrical system. In an embodiment of the invention, the dry-out time for an electrical system is deduced from the datalogger record. The "inhibit startup" signal remains active until completion of the dry-out procedure, which takes as long as the longest dry-out time.

The rate of evaporation of moisture from an electrical system can also depend on the efficacy of a device such as a ventilator or a heater. The efficacy of such a device is the degree of ability of the device at drying an electrical system to the desired level. In an embodiment of the invention, therefore, the dry-out time of an electrical system is determined also on the basis of the efficacy of a climate control device.

An electrical system may comprise one or materials that are hygroscopic, i.e., materials that absorb moisture. The water absorbed by such materials may take longer to evaporate than water droplets on the surface of a component. Therefore, in an embodiment of the invention, the dry-out time of an electrical system also takes a moisture-retention property into account, and the dryness of such an electrical system can be established on the basis of a resistivity measurement. For example, the conductivity of a hygroscopic material such as dry paper or magnesium oxide, which may be used as an insulator for electrical conductors, can increase when the electrical system is exposed to a cold, humid environment for a prolonged length of time. An indication of the dryness of that electrical system can therefore be estimated to a satisfactory level of accuracy by measuring the resistivity (or conductivity) of the hygroscopic material.

In addition to sensors that send data to dataloggers, the wind turbine can be equipped with further sensors that report directly to the turbine controller. In an embodiment of the invention, in addition to sending its output to a datalogger, a sensor placed to monitor the environment in an electrical system may also output its data to the wind turbine controller. In this way, signal data need not pass through a datalogger during periods of time where the wind turbine is powered.

After a prolonged period of time without auxiliary power, the climate in the interior of the wind turbine nacelle (or tower) can be very cold. In an embodiment of the invention, the wind turbine is equipped with a source of heat to provide heat during a dry-out procedure. Any suitable method may be deployed to raise the temperature in the interior, and the wind turbine may be equipped with one or more devices to implement resistive heating of the air or a fluid in the vicinity of an electrical system.

Completion of dry-out is established when certain conditions are fulfilled. During dry-out, the sensor measurements reported by the dataloggers of the electrical systems being dried can be continually evaluated against certain dryness criteria. Equally, since auxiliary power is restored, an alternative arrangement of sensors can also be implemented to evaluate the dryness of the electrical systems in addition to the data delivered by the dataloggers.

Dryness criteria may include any of: a target temperature (for example an air temperature, a surface temperature, an internal temperature) maintained for a minimum length of time; a target relative humidity, air moisture content level, or component moisture content level; a target resistance or other electrical property of a component. Once the dry-out procedure for an electrical system is deemed to be complete, the wind turbine controller sets the dryness status flag of the appropriate timestamp to "true", records the time, and removes the startup inhibit signal.

The aspect of embodiments of the invention are also achieved by a computer program product (non-transitory computer readable storage medium having instructions, which when executed by a processor, perform actions) with a computer program that is directly loadable into the memory of a wind turbine controller, and which comprises program units to perform the steps of the inventive method when the program is executed by the control unit.

BRIEF DESCRIPTION

Some of the embodiments will be described in detail, with references to the following Figures, wherein like designations denote like members, wherein.

DETAILED DESCRIPTION

Figure 1:
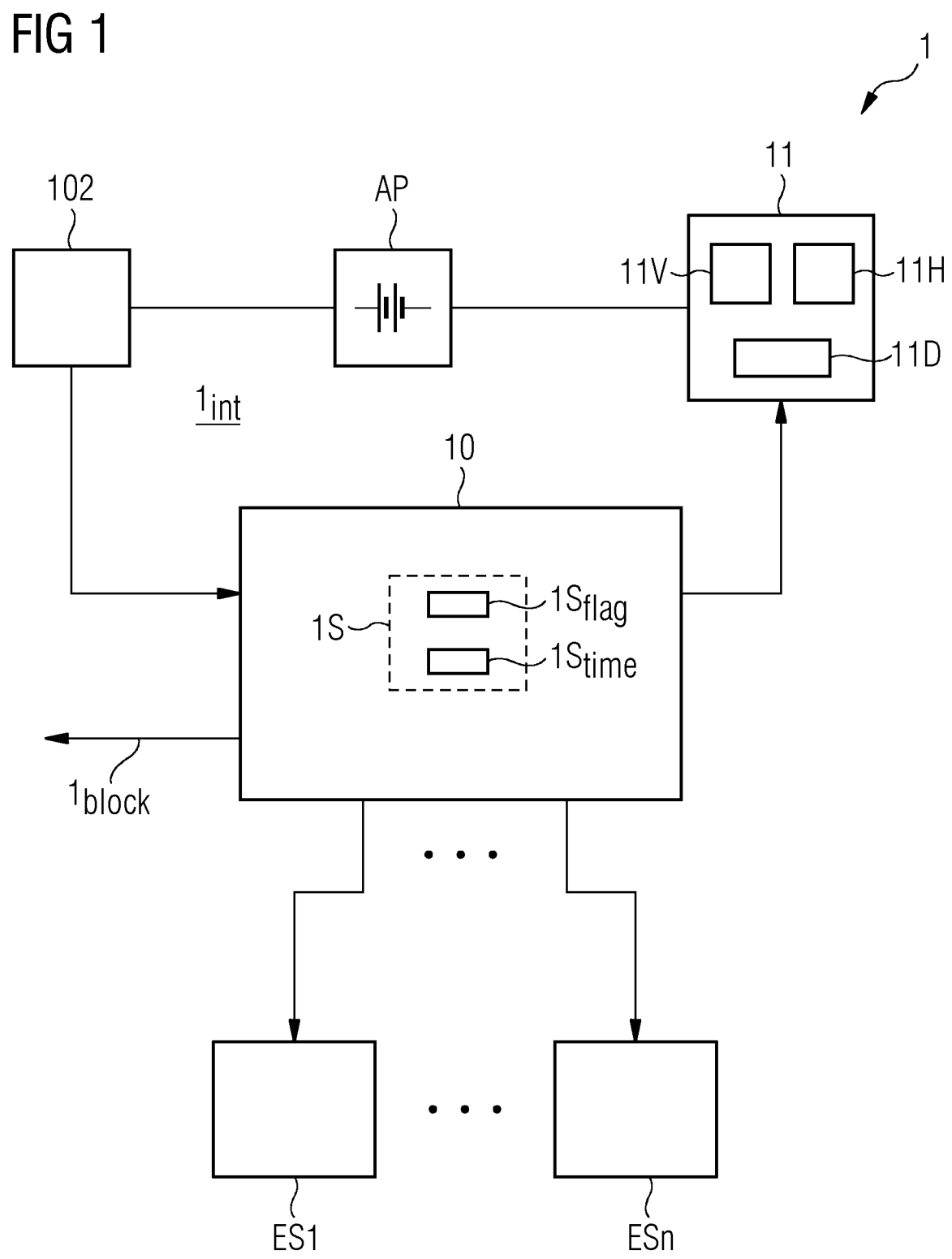
FIG. 1 illustrates a control arrangement in an embodiment of the inventive wind turbine.

FIG. 1 shows relevant components in an interior space lint of a wind turbine 1 according to a first embodiment. The diagram shows a number of electrical systems ES1, . . . , ESn arranged in the interior $1_{int}$ (e.g., inside the nacelle) and a wind turbine controller 10 that is configured to control the various electrical systems ES1, . . . , ESn as required. Here, the electrical systems ES1, . . . , ESn can be the wind turbine generator, a power converter, a transformer, a power filter etc., as will be known to the skilled person. In this exemplary realization, a climate control arrangement 11 with one or more modules such as a dehumidifier 11D, a ventilator 11V, a heater 11H, etc. is operated to maintain a desired environment in the interior lint during operation of the wind turbine 1. An auxiliary power supply AP is indicated, and this is configured to provide power at least to the modules of the climate control arrangement 11 as required, for example during a shut-down state.

During normal operation of the wind turbine 1, the climate in the interior is monitored, for example by analyzing temperature and humidity measurements from various sensors in the wind turbine interior $1_{int}$, and the units and modules of the climate control arrangement 11 are operated to maintain a desired environment. As long as all requirements are satisfied, the electrical systems ES1, . . . , ESn of a wind turbine can be assumed to be "dry".

Within a certain time following loss of auxiliary power, the wind turbine 1 can restart without risk of short-circuit due to moisture. However, if the auxiliary power was absent for a prolonged length of time, dryness of the wind turbine systems ES1, . . . , ESn cannot be assumed.

Here, the wind turbine controller 10 also comprises a voltage measurement unit 102 that can detect the presence or absence of auxiliary power, i.e., whether or not there is a supply of power for the wind turbine's auxiliary systems, in particular for the climate control arrangement 11.

In an embodiment of the invention, the elapsed time without auxiliary power is determined after power is once again restored. If the elapsed time is less than a predetermined duration (e.g., a 72 hours), the wind turbine can be re-started. If the elapsed time exceeds that predetermined duration, the system is considered to be "not dry", and a dry-out procedure is conducted.

Dry-out is performed by operating the climate control assembly 11 as necessary, for example by operating a heater 11H and a ventilator 11V at full capacity.

In a more sophisticated approach, the "dry" state of the wind turbine is recorded in the form of a timestamp 1S. During normal operation of the wind turbine, the dryness timestamp 1S is updated at intervals, for example every few minutes. As long as the appropriate dryness requirements are fulfilled, the "dry status" flag $1S_{flag}$ is set to "true", and the time $1S_{time}$ is recorded. Should the requirements for dryness not be fulfilled, the flag $1S_{flag}$ is set to "false", and again the time $1S_{time}$ is recorded.

During absence of power, the wind turbine controller is inactive, so that the timestamp 1S is not altered in that time. When power is once again restored, the wind turbine controller can examine the timestamp 1S to see whether or not the wind turbine dryness requirement is met.

Figure 2:
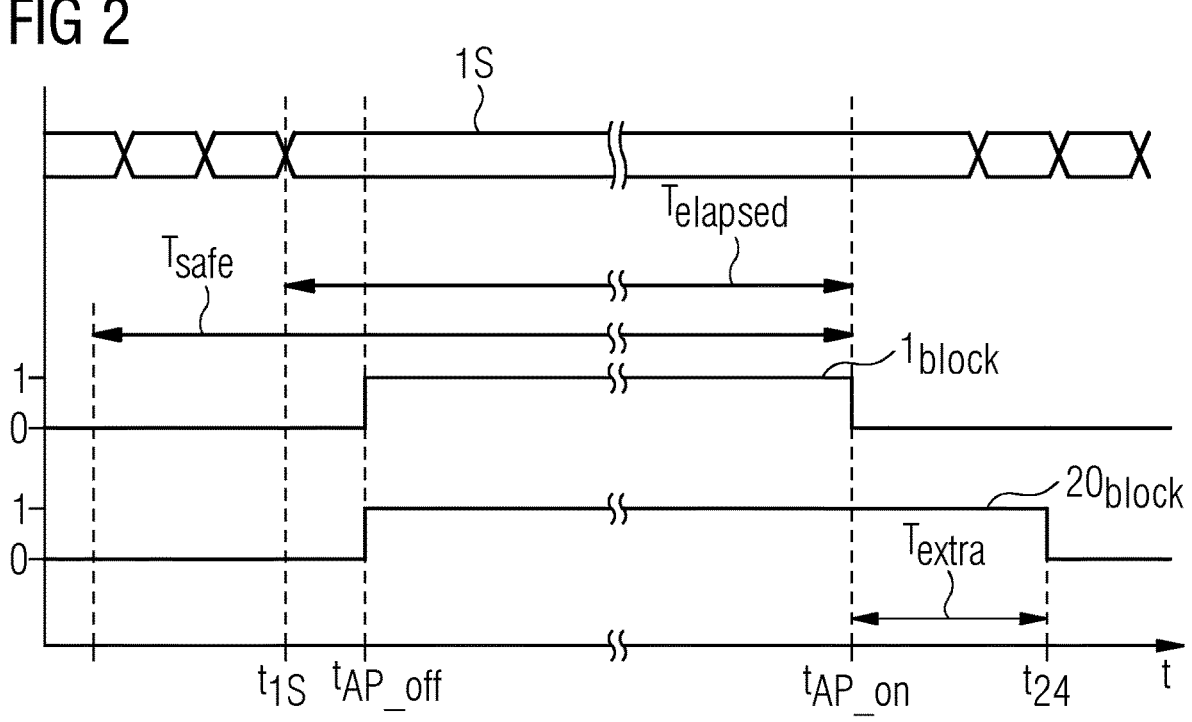
FIG. 2 shows exemplary timing diagrams for the wind turbine of FIG. 1 being controlled using the inventive method.

FIG. 2 shows an exemplary situation to illustrate the inventive method as applied to the wind turbine of FIG. 1. Here, a "system dry" timestamp 1S being updated at regular intervals as long as auxiliary power is available. This "system dry" timestamp 1S applies collectively to all electrical systems ES1, -, Esn of the wind turbine 1. The dryness timestamp 1S is "frozen" at time $t_{AP\_off}$ i.e., when auxiliary power becomes unavailable. The dryness timestamp 1S comprises the time $t_{1S}$ at which it was last updated, and the dryness state ("dry" or "not dry") of the wind turbine at that time $t_{1S}$.

After restoration of auxiliary power at time $t_{AP\_on}$, the wind turbine controller 10 is again operational and examines the dryness timestamp 1S to determine the elapsed time $T_{elapsed}$ ($t_{AP\_on}$ minus tis) since the dryness timestamp was last updated. In this case, the elapsed time $T_{elapsed}$ is less than the predefined duration $T_{safe}$ (for example 72 hours), and the dryness status of timestamp 1S was "dry", so that the wind turbine controller 1 is free to initiate a start-up procedure. Here, the block-startup signal $1_{block}$ that inhibits startup is removed essentially immediately after return of auxiliary power, since the wind turbine controller 10 assumes that the electrical systems are in a state of dryness that is acceptable for safe startup. In contrast, a prior art wind turbine will only clear its inhibit-startup signal $20_{block}$ after a set length of 24 hours has elapsed at time $t_{24}$. Therefore, the inventive wind turbine can export output power during the time $T_{extra}$ (essentially 24 hours in this case) that would otherwise be spent waiting for a 24-hour dry-out time to elapse. With the return of auxiliary power, the dryness timestamp is updated at regular intervals once more.

Figure 3:
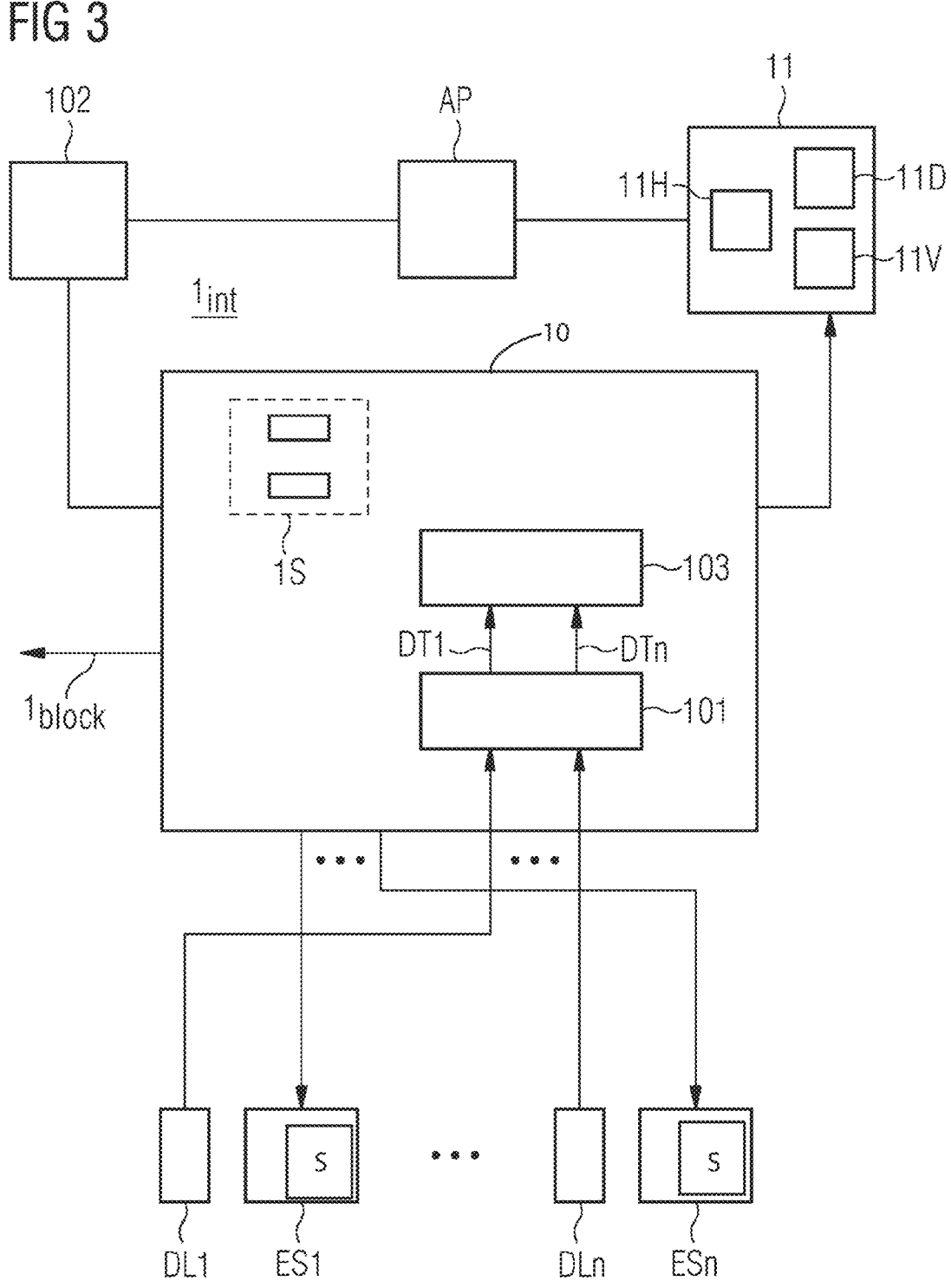
FIG. 3 illustrates a control arrangement in a further embodiment of the inventive wind turbine.
Figure 4:
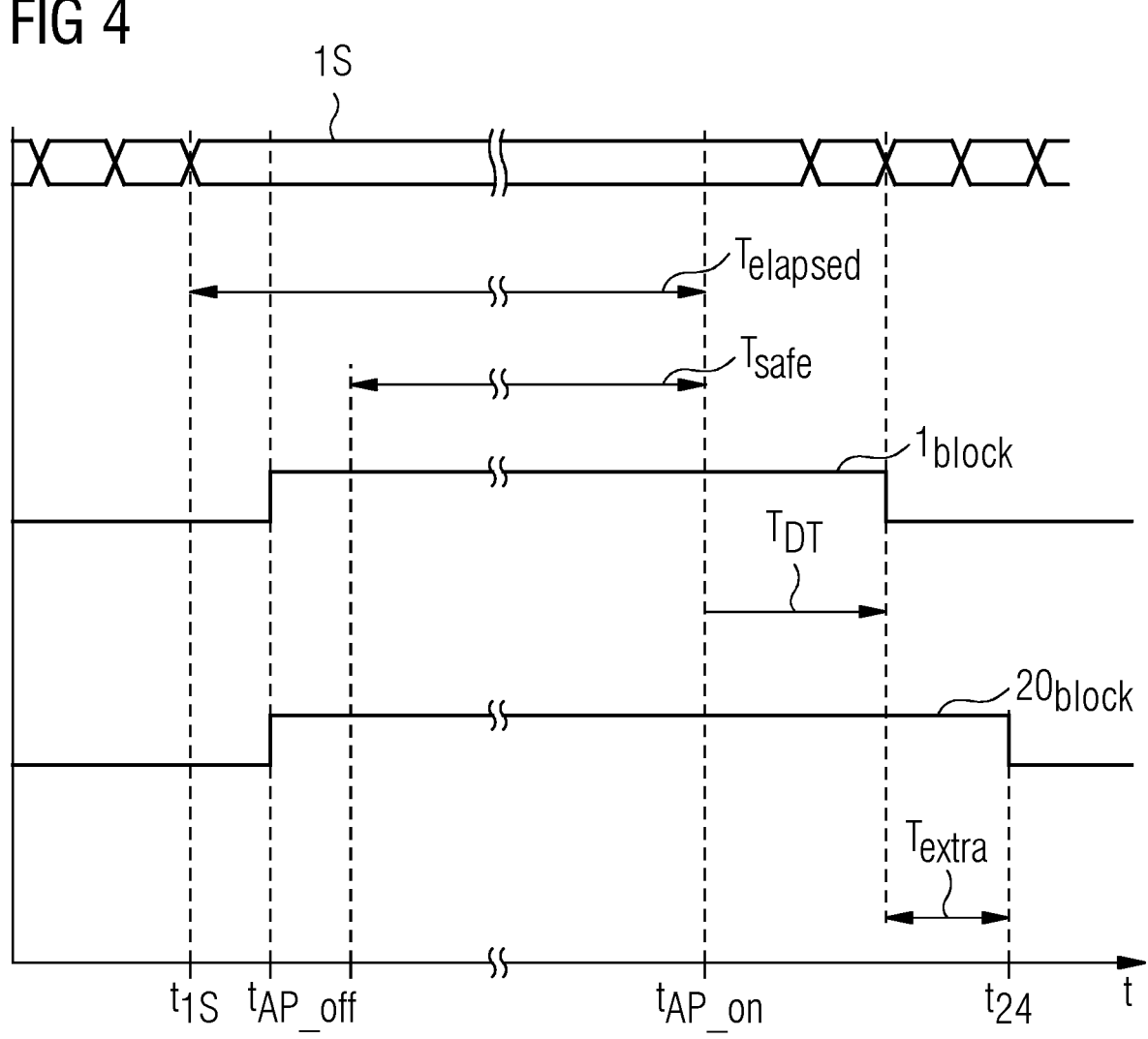
FIG. 4 shows exemplary timing diagrams for the wind turbine of FIG. 3 being controlled using the inventive method.

The wind turbine 1 of FIG. 3 is similar to the wind turbine of FIG. 1. In this exemplary embodiment, each electrical system ES1, . . . , ESn is equipped with a number of sensors S and a datalogger DL1, . . . , DLn. Each datalogger DL1, . . . , DLn records data from the sensors S to which it is connected, and can output that data in a form that can be read by a wind turbine controller 10.

Each electrical system ES1, . . . , ESn is equipped with an appropriate set of sensors S, for example sensors for monitoring the relative humidity of the air inside that electrical system, the air temperature inside that electrical system, and a surface temperature of a component of that electrical system. The sensors S continually (at suitable intervals such as every minute, every 10 minutes, etc.) output their measurements to the dataloggers DL1, . . . , DLn, also during periods when there is no power available to the wind turbine's climate control arrangement 11. The dataloggers DL1, . . . , DLn may be powered by stored energy, such as a battery, so that they have multiple months or years of energy available to continue monitoring environmental conditions and storing the associated data. Each datalogger DL1, . . . , DLn is activated following the initial assembly of its electrical system ES1, . . . , ESn in a controlled factory environment. In this way, historical data is available during the post-assembly storage, transport, and installation of the electrical systems ES1, . . . , ESn of the wind turbine 1. The dataloggers DL1, . . . , DLn are operational throughout the lifetime of the wind turbine 1.

As explained with FIG. 1 and FIG. 2 above, when auxiliary power becomes available after being absent, the wind turbine 1 can be started if the elapsed time $T_{elapsed}$ is less than the predetermined "safe" time $T_{safe}$. However, if the elapsed time $T_{elapsed}$ is longer than the predetermined "safe" time $T_{safe}$, a dryout procedure is required. In a more considered approach to performing dryout, the actually required dry-out time of an electrical system ES1, . . . , ESn is determined by a computation means 101 as shown in FIG. 3. The dry-out time DT1, . . . , DTn of an electrical system is the time it will take under the present circumstances to achieve a state of dryness that will permit that electrical system to restart. To this end, the dry-out time computation means 101 obtains the stored data from the dataloggers DL1, . . . , DLn and—for each electrical system—computes the required dry-out time DT1, . . . , DTn. The longest dry-out time dictates the earliest time at which the wind turbine 1 can restart. In this example, the longest dryout time $T_{DT}$ (one of DT1, . . . , DTn) may be only a few hours, after which the wind turbine can start. In this exemplary embodiment, a dryout management module 103 can identify the longest dryout time $T_{DT}$ and can also generate appropriate control signals to the climate control arrangement 11 for the duration of that dryout time $T_{DT}$, for example to operate a heater 11H and a dehumidifier 11D at maximum power until the dryout time $T_{DT}$ has elapsed. Once the dryout time $T_{DT}$ has elapsed, the inhibit-startup signal $1_{block}$ is removed, since the wind turbine controller 10 then assumes that all electrical systems are in a state of dryness that is acceptable for safe startup. In contrast, a prior art wind turbine will only clear its inhibit-startup signal $20_{block}$ after a set length of 24 hours. Therefore, the inventive wind turbine can export output power during a time $T_{extra}$ that would otherwise be spent waiting for a set dry-out time to elapse.

Figure 5:
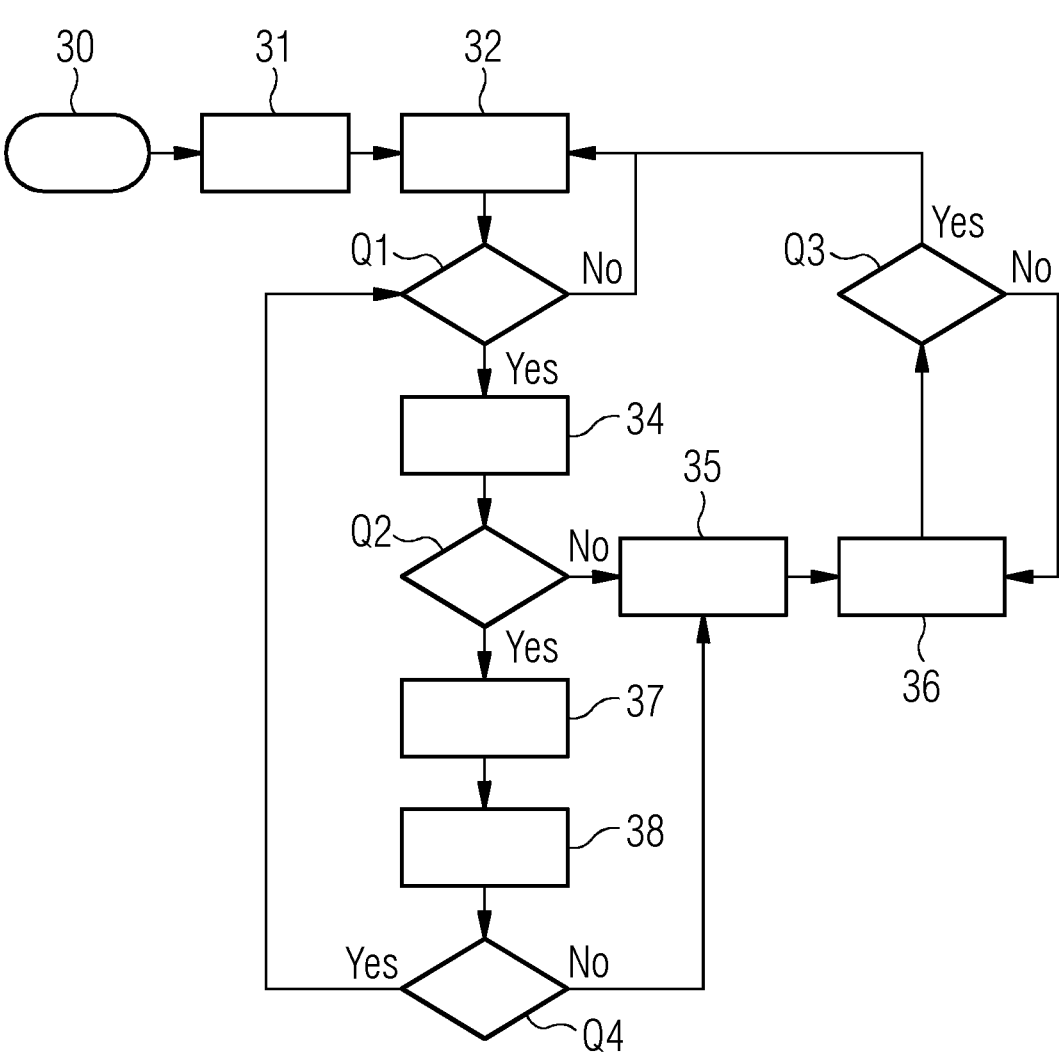
FIG. 5 shows a flowchart to illustrate the inventive method.

FIG. 5 shows an exemplary flowchart for an embodiment of the inventive method. In a first stage 30, electrical systems of a wind turbine are assembled in a factory setting. In step 31, a "wind turbine dry" flag $1S_{flag}$ of a system dry time-stamp $1S$ is set to "true" and the time $1S_{time}$ is recorded. The wind turbine is then assembled, and the next step 32, Q1 is to wait until auxiliary power is present. When auxiliary power is detected at stage 34, the elapsed time since the "wind turbine dry" flag $1S_{flag}$ was set is compared to a predetermined threshold.

Q2 ask if the elapsed time was shorter, the wind turbine is allowed to start at stage 35. The timestamp time $1S_{time}$ is updated in step 36. During subsequent operation of the wind turbine, the availability of auxiliary power is regularly queried at Q3, and control remains at 36 (auxiliary power present) or returns to 32 (auxiliary power absent).

If the elapsed time was longer, the dry-out time is determined for the electrical system in stage 37, and dry-out is performed in stage 38. During the dry-out procedure, the availability of auxiliary power is regularly queried in stage Q4, and control returns to query Q1 (auxiliary power lost) or proceeds to stage 35 (auxiliary power present; dry-out complete).

Figure 6:
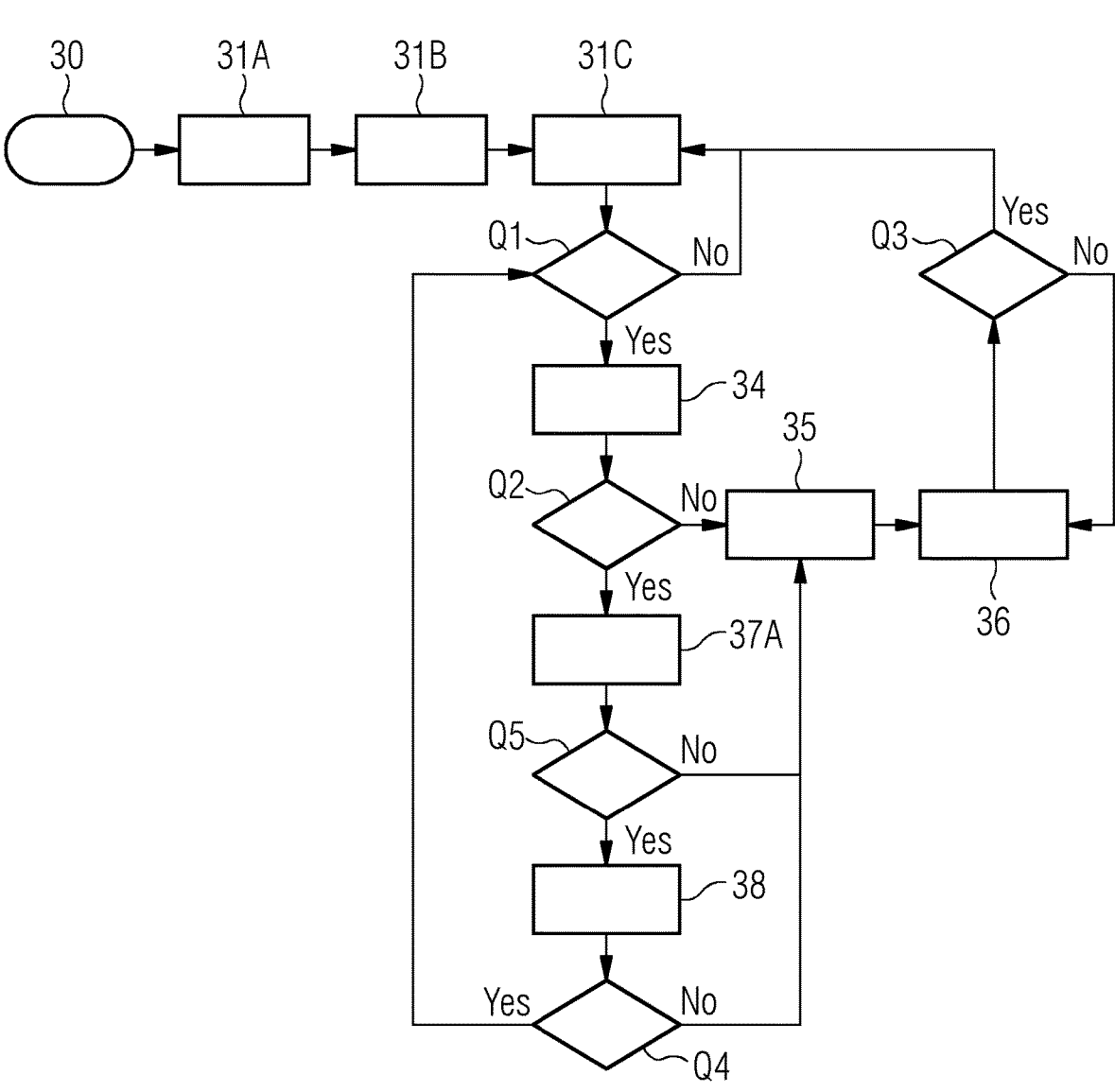
FIG. 6 shows a flowchart to illustrate the inventive method.

FIG. 6 shows an exemplary flowchart for a further embodiment of the inventive method. In a first stage 30, electrical system of a wind turbine are assembled in a factory setting, and each electrical system is equipped with sensors and a datalogger. In step 31A, data-logging is activated. In step 31B, a "wind turbine dry" flag $1S_{flag}$ of a system dry timestamp $1S$ is set to "true" and the time $1S_{time}$ is recorded. The wind turbine is then assembled. In step 31C, in the absence of auxiliary power, sensor data is collected and recorded by the dataloggers, and the next step Q1 is to wait until auxiliary power is present. When auxiliary power is detected at stage 34, the elapsed time since the "wind turbine dry" flag $1S_{flag}$ was set is compared to a predetermined threshold.

If the elapsed time was shorter, the wind turbine is allowed to start at stage 35. The timestamp time $1S_{time}$ is updated in step S36. During subsequent operation of the wind turbine, the availability of auxiliary power is regularly queried, and control remains at stage 36 (auxiliary power present) or returns to stage 32 (auxiliary power absent).

If the elapsed time was longer, the dry-out time is determined for the electrical system in stage 37A on the basis of the data recorded in the dataloggers. In query Q5, the wind turbine controller determines whether any of the electrical system requires drying out. Any such dry-out is performed in stage 38. During the dry-out procedure, the availability of auxiliary power is regularly queried in stage Q4, and control returns to query Q1 (auxiliary power lost) or proceeds to stage 35 (auxiliary power present; dry-out complete).

Figure 7:
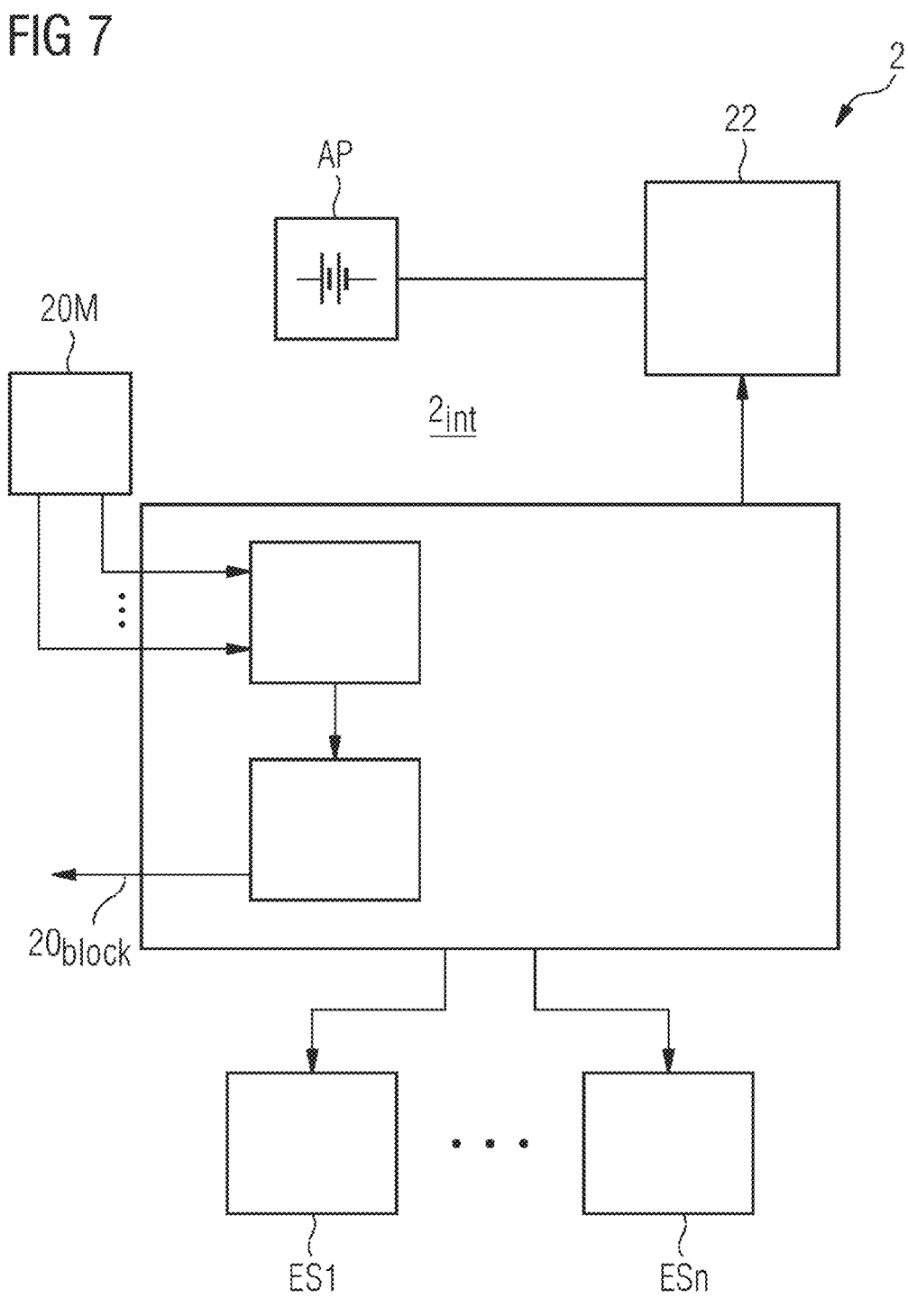
FIG. 7 shows a prior wind turbine control arrangement.

In a prior art approach, as illustrated by FIG. 7, the dryness of a wind turbine's electrical systems is established on the basis of temperature and humidity measurements collected by a climate monitoring unit 20M in the interior $2_{int}$ of the wind turbine 2. The dryness requirement of the prior art wind turbine 2 is satisfied when the combination of temperate and humidity (relative or absolute) in the interior space $2_{int}$ is acceptable. The temperature may be the air temperature in the interior of the nacelle, for example. The dryness requirement may be considered to be satisfied if the relative humidity does not exceed 60% and the air temperature does not drop below 10° C. However, during absence of auxiliary power, the temperature in the interior may decrease significantly—for example to near the dew point—and water vapor condenses. The combination of low temperature and high humidity are assumed to result in condensation or water droplets on sensitive parts of one or more electrical systems ES1, . . . , ESn, and a dry-out will be deemed necessary. The inhibit-startup signal $20_{block}$ is set to "high", so that restart of the wind turbine 2 is prevented. After restoration of auxiliary power, restart is prevented for a set length of time, usually in the order of 24 hours, during which the climate control 11 is operated at full capacity. During this time, the wind turbine 2 cannot export power.

Although the present invention has been disclosed in the form of embodiments and variations thereon, it will be understood that numerous additional modifications and variations could be made thereto without departing from the scope of embodiments of the invention. For example, a dry-out procedure can be initiated at any time by a user or operator. For example, in any situation that is not covered by the automated monitoring described above, manual dry-out can be initiated. This can be useful when a component that may have come from a moist environment is replaced in an electrical system, or after clean-up following a leakage or spillage of liquids. For a manual dry-out procedure, the user may identify the specific electrical system, the dry-out duration, a target air temperature, etc. The inventive approach can be applied to any machinery or apparatus with an interior space in which one or more electrical systems are arranged, and which must be dry before the machinery is re-started after a prolonged downtime without power.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine, the method comprising:
   detecting a power-on time at which an auxiliary power for the wind turbine becomes available after an absence of the auxiliary power;
   determining, at the power-on time, an elapsed time since a dryness requirement of the wind turbine was satisfied, the dryness requirement including at least a dryness of an electrical system of the wind turbine; and either
   initiating a wind turbine start-up procedure if the elapsed time does not exceed a predetermined duration, or
   inhibiting the wind turbine start-up procedure if the elapsed time exceeds the predetermined duration.

2. The method according to claim 1, further comprising performing a dry-out procedure for the electrical system of the wind turbine if the elapsed time exceeds the predetermined duration.

3. The method according to claim 2, further comprising initiating the wind turbine start-up procedure after completion of the dry-out procedure.

4. The method according to claim 2, wherein a duration of the dry-out procedure is determined on a basis of the dryness of the electrical system of the wind turbine.

5. The method according to claim 4, wherein the dryness of the electrical system is established on a basis of a temperature measurement and/or a relative humidity measurement and/or a resistivity measurement obtained for the electrical system.

6. The method according to claim 4, wherein a state of the dryness of the electrical system of the wind turbine is recorded as a dryness timestamp, the dryness timestamp comprising a dryness status flag and a time of recording.

7. The method according to claim 6, further comprising initializing the dryness timestamp when a wind turbine control arrangement is installed, the initializing comprising setting the dryness status flag to indicate a dry state.

8. The method according to claim 1, further comprising computing a dry-out time for the electrical system of the wind turbine on a basis of a moisture-retention property of a material of the electrical system.

9. The method according to claim 1, further comprising computing a dry-out time for the electrical system of the wind turbine on a basis of an efficacy of a climate control apparatus arranged in an interior of the wind turbine, the climate control apparatus comprising at least one of a heater and a ventilator, wherein the efficacy is determined based on a rate of moisture evaporation measured during operation of the climate control apparatus.

10. A computer program product, comprising a computer readable hardware storage device having computer readable program code stored therein, said program code executable by a processor of a computer system to implement a method according to claim 1 when the computer program is executed by a wind turbine control arrangement.

* * * * *